(12) United States Patent
Li

(10) Patent No.: US 10,733,809 B2
(45) Date of Patent: Aug. 4, 2020

(54) INFORMATION PROCESSING DEVICE AND INFORMATION PROCESSING METHOD

(71) Applicant: Sony Corporation, Tokyo (JP)

(72) Inventor: Ji Li, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/330,099

(22) PCT Filed: Aug. 9, 2017

(86) PCT No.: PCT/CN2017/096562
§ 371 (c)(1),
(2) Date: Mar. 4, 2019

(87) PCT Pub. No.: WO2018/045853
PCT Pub. Date: Mar. 15, 2018

(65) Prior Publication Data
US 2019/0236850 A1    Aug. 1, 2019

(30) Foreign Application Priority Data

Sep. 8, 2016 (CN) .......................... 2016 1 0811548

(51) Int. Cl.
*G06T 19/20* (2011.01)
*G09C 5/00* (2006.01)
(Continued)

(52) U.S. Cl.
CPC .............. *G06T 19/20* (2013.01); *G06F 21/16* (2013.01); *G06T 1/0021* (2013.01);
(Continued)

(58) Field of Classification Search
None
See application file for complete search history.

(56) References Cited

U.S. PATENT DOCUMENTS 6,208,347 B1 * 3/2001 Migdal .................. G06T 17/20
345/419
9,704,270 B1 * 7/2017 Main ........................ G06T 9/00
(Continued)

FOREIGN PATENT DOCUMENTS

| CN | 101119485 A | 2/2008 |
| CN | 101430792 A | 5/2009 |
| CN | 102360515 A | 2/2012 |

OTHER PUBLICATIONS

Chen, Bing-Yu, and Tomoyuki Nishita. "Multiresolution streaming mesh with shape preserving and QoS-like controlling." Proceedings of the seventh international conference on 3D Web technology. 2002.*

(Continued)

*Primary Examiner* — Sultana M Zalalee
(74) *Attorney, Agent, or Firm* — Xsensus LLP

(57) ABSTRACT

Provided are an information processing device and an information processing method. The information processing device (100) comprises a processing circuit (110) configured to eliminate partial details of at least one part of a three-dimensional model on a condition that a shape semantics of the at least one part is maintained unchanged, so as to generate a modified version of the three-dimensional model. The processing circuit (110) is further configured to control to send the modified version and recovery information to a recipient, wherein the recovery information is used to restore the modified version to the original version of the three-dimensional model.

8 Claims, 11 Drawing Sheets

(51) Int. Cl.
*G06T 1/00* (2006.01)
*G06F 21/16* (2013.01)

(52) U.S. Cl.
CPC .............. *G06T 1/0028* (2013.01); *G09C 5/00* (2013.01); *G06T 2201/0203* (2013.01); *G06T 2219/2021* (2013.01)

(56) References Cited

U.S. PATENT DOCUMENTS

| | | | |
|---|---|---|---|
| 2004/0249617 A1 | 12/2004 | Lau et al. | |
| 2006/0075228 A1* | 4/2006 | Black | H04L 63/0428 713/167 |
| 2008/0037781 A1* | 2/2008 | Kocher | G11B 20/0021 380/201 |
| 2009/0067671 A1* | 3/2009 | Alattar | H04N 1/32283 382/100 |
| 2014/0046473 A1* | 2/2014 | Boynton | G06F 30/20 700/119 |
| 2014/0058959 A1* | 2/2014 | Isbjornssund | G06Q 50/184 705/310 |
| 2014/0082369 A1* | 3/2014 | Waclawsky | G06F 21/62 713/189 |
| 2016/0129638 A1* | 5/2016 | Bostick | G05B 15/02 700/98 |
| 2016/0133049 A1* | 5/2016 | Hill | G06T 17/10 700/98 |
| 2017/0358133 A1* | 12/2017 | Iverson | H04N 13/106 |

OTHER PUBLICATIONS

Gschwandtner, Michael, and Andreas Uhl. "Protected progressive meshes." International Symposium on Visual Computing. Springer, Berlin, Heidelberg, 2009.*

Barni, Mauro, et al. "Digital watermarking of 3D meshes." Mathematics of Data/Image Coding, Compression, and Encryption VI, with Applications. vol. 5208. International Society for Optics and Photonics, 2004.*

Vasic, Bata, and Bane Vasic. "Simplification resilient LDPC-coded sparse-QIM watermarking for 3D-meshes." IEEE Transactions on Multimedia 15.7 (2013): 1532-1542.*

Chen, Hung-Kuang, and Yung-Hung Chen. "Progressive watermarking on 3D meshes." 2010 IEEE International Symposium on Broadband Multimedia Systems and Broadcasting (BMSB). IEEE, 2010.*

International Search Report dated Nov. 15, 2017 for PCT/CN2017/096562 filed on Aug. 9, 2017, 9 pages including English Translation.

Éluard et al., "Geometry-Preserving Encryption for 3D Meshes", CORESA, France, Nov. 28-29, 2013, 7 pages.

IEEE, "Encryption of Progressive Meshes", 61 pages.

* cited by examiner

INFORMATION PROCESSING DEVICE AND INFORMATION PROCESSING METHOD

CROSS-REFERENCE TO RELATED APPLICATIONS

The present application is based on PCT filing PCT/CN2017/096562, filed Aug. 9, 2017, which claims priority to CN 201610811548.3, filed Sep. 8, 2016, the entire contents of which are incorporated herein by reference.

FIELD

The present disclosure generally relates to information processing, and more particularly to an information processing apparatus and an information processing method for a three-dimensional model.

BACKGROUND

With the widespread use of technologies related to three-dimensional (3D) models such as a 3D printing technology and a 3D scanning technology, the protection of intellectual property rights of 3D models has become a new challenge. Taking 3D printing applications as an example, 3D printing collaborative manufacturing, 3D model sharing design or transaction, and 3D related product experience purchase all involve the protection of 3D models.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an information processing apparatus includes a processing circuit configured to remove a local detail of at least one part of a three-dimensional model while keeping shape semantics of the at least one part unchanged, to generate a modified version of the three-dimensional model. The processing circuit is further configured to perform a control to transmit the modified version and restoration information to a receiver, where the restoration information is used for restoring the modified version to an original version of the three-dimensional model.

According to another embodiment, an information processing method includes a step of removing a local detail of at least one part of a three-dimensional model while keeping shape semantics of the at least one part unchanged to generate a modified version of the three-dimensional model. The method further includes a step of transmitting the modified version and restoration information to a receiver, where the restoration information is used for restoring the modified version to an original version of the three-dimensional model.

According to another embodiment, an information processing apparatus includes a processing circuit configured to perform a control to receive a modified version of a three-dimensional model from a sender, the modified version being generated by removing a local detail of at least one part of the three-dimensional model while keeping shape semantics of the at least one part unchanged. The processing circuit is further configured to perform a control to render the modified version. The processing circuit is further configured to restore the modified version to an original version of the three-dimensional model based on restoration information received from the sender.

According to another embodiment, an information processing method includes a step of receiving a modified version of a three-dimensional model from a sender, the modified version being generated by removing a local detail of at least one part of the three-dimensional model while keeping shape semantics of the at least one part unchanged. The method further includes a step of rendering the modified version. The method further includes a step of restoring the modified version to an original version of the three-dimensional model based on restoration information received from the sender.

With the embodiments according to the present disclosure, operations such as preview and authorized distribution of a 3D model can be performed while ensuring data security of the 3D model.

BRIEF DESCRIPTION OF THE DRAWINGS

The present disclosure can be understood better with reference to the description given in conjunction with the drawings in the following. The same or similar element is indicated by the same or similar reference numeral throughout all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
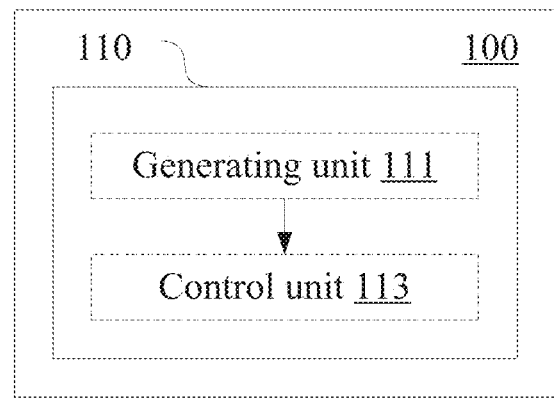
FIG. 1 is a block diagram showing a configuration example of an information processing apparatus according to an embodiment of the present disclosure.

Embodiments of the present disclosure are described below with reference to the drawings. Elements and features described in one drawing or one embodiment of the present disclosure may be combined with elements and features illustrated in one or more other drawings or embodiments. It should be noted that, for clarity, indication and description of components and processing irrelevant to the present disclosure and known by those skilled in the art are omitted in the drawings and the illustration.

As shown in FIG. 1, an information processing apparatus 100 according to an embodiment includes a processing circuit 110. The processing circuit 110 may be implemented as, for example, a specific chip, a chipset, or a central processing unit (CPU).

The processing circuit 110 includes a generating unit 111 and a control unit 113. It should be noted that, the generating unit 111 and the control unit 113 are shown in the form of functional blocks in FIG. 1, but functions of the generating unit 111 and the control unit 113 may be implemented by the processing circuit 110 as a whole, and it is not necessarily implemented by separate actual components in the processing circuit 110. In addition, although the processing circuit 110 is illustrated as a block in FIG. 1, the information processing apparatus 100 may include multiple processing circuits, and the functions of the generating unit 111 and the control unit 113 may be distributed into the multiple processing circuits such that the multiple processing circuits operate in cooperation with each other to perform the functions.

The generating unit 111 is configured to remove a local detail of at least one part of a three-dimensional model while keeping shape semantics of the at least one part unchanged to generate a modified version of the three-dimensional model.

The information processing apparatus according to the present embodiment may be used, for example, as a server for a three-dimensional model, and is used for distributing the three-dimensional model to a receiver requesting the three-dimensional model. Accordingly, the modified version may be used for preview of the receiver. Therefore, in the following, the modified version of the three-dimensional model sometimes may also be referred to as a "preview version".

In addition, keeping shape semantics unchanged indicates that the part of the three-dimensional model of which a local detail is removed still contains basic semantic information of the part before the local detail is removed.

For example, it is assumed that the part of the three-dimensional model that is an object of the detail removal process is a car. If the processed object still exhibits a shape of the car, the shape semantics of the object is kept unchanged in this process. In addition, if the processed object has for example, a cuboid shape, and the object cannot be recognized as a car according to the shape, the shape semantics of the object is not kept unchanged in this process.

According to a specific embodiment, the generating unit 111 may perform local detail removal by one or more of smoothing, vertex elimination, and three-dimensional mesh simplification.

Figure 16A:
FIG. 16A and FIG. 16B illustrate detail removal effect of a part of an exemplary three-dimensional model obtained by a mesh simplification process.
Figure 16B:

Specifically, the smoothing, vertex elimination, or three-dimensional mesh simplification may be performed by various methods known in the art. As an example, FIG. 16A and FIG. 16B illustrate detail removal effect of a part of an exemplary three-dimensional model obtained by a mesh simplification process, in which a Stanford Bunny (see https://graphics.stanford.edu/data/3Dscanrep) is taken as an example of a 3D model. FIG. 16A shows the object before the mesh simplification process, and FIG. 16B shows the object after the mesh simplification process. The object after the mesh simplification process in FIG. 16B contains less details than the object in FIG. 16A. However, the object in FIG. 16B still contains the same basic semantic information as the object in FIG. 16A. That is, both the object in FIG. 16B and the object in FIG. 16A exhibit a shape of the bunny.

There are various modification means for removing the local detail of the three-dimensional model. Depending on the shape semantics carried by the three-dimensional model or the part thereof, the modification means have different roles in preserving the shape semantics of the three-dimensional model. An appropriate modification means may be selected in advance according to the specific shape semantics carried by the three-dimensional model or the part thereof.

Referring back to FIG. 1, the control unit 113 is configured to perform a control to transmit the modified version and restoration information to a receiver. The restoration information is used for restoring the modified version to an original version of the three-dimensional model. In other words, the restoration information is related to the local detail removal process performed by the generating unit 111. For example, a local detail restoration process corresponding to the local detail removal process may be performed based on the restoration information, to obtain the original three-dimensional model.

With the above embodiment, a preview version of the three-dimensional model is provided to the receiver, and the preview version has a reduced detail level compared with the original three-dimensional model while keeping the shape semantics of the original three-dimensional model. Therefore, the global preview of the three-dimensional model by the receiver is not affected while ensuring the data security of the original three-dimensional model, thereby facilitating the receiver to determine whether to obtain (for example, purchase) the authorization of the original three-dimensional model. On the other hand, for an authorized receiver who has obtained the preview version, only the restoration information with a small amount of data needs to be transmitted later, so that the communication load can be reduced.

Next, an exemplary process of processing a three-dimensional model to be protected to generate a preview version according to an embodiment of the present disclosure is described. It should be understood that the present disclosure is not limited to the details in the examples below.

Firstly, a three-dimensional mesh of an original three-dimensional model is generated. Next, the generated three-dimensional mesh is simplified, for example, by an evolutionary encryption method such as adjacent mesh vertex merging, mesh edge elimination, mesh Gaussian smoothing (for example, see "Encryption of Progressive Meshes", www.cosy.sbg.ac.at/~uhl/SEVCM/Fr_Vo_3_mesh_encrypt.pdf and "Geometry-preserving Encryption for 3D Meshes, Marc éluard, Yves Maetz, Gwenaël Doërr, COmpression et REprésentation des Signaux Audiovisueis (CORESA) 2013"). In the simplification process, for example, the degree of mesh simplification may be controlled in an automatic or semi-automatic manner (for example, by controlling the number or proportion of merged vertexes, the number or proportion of eliminated edges, or the degree of smoothing), so that the shape semantics of the processed object is kept unchanged.

In addition, for example, difference data between the original version and the preview version may be retained as the restoration information. According to some embodiments, the restoration information may be encrypted, for example, by using conventional data encryption technologies. The difference data may then be transmitted to the authorized receiver, or the encrypted difference data may be embedded into the simplified model, for example by means of a three-dimensional watermark.

Figure 13:
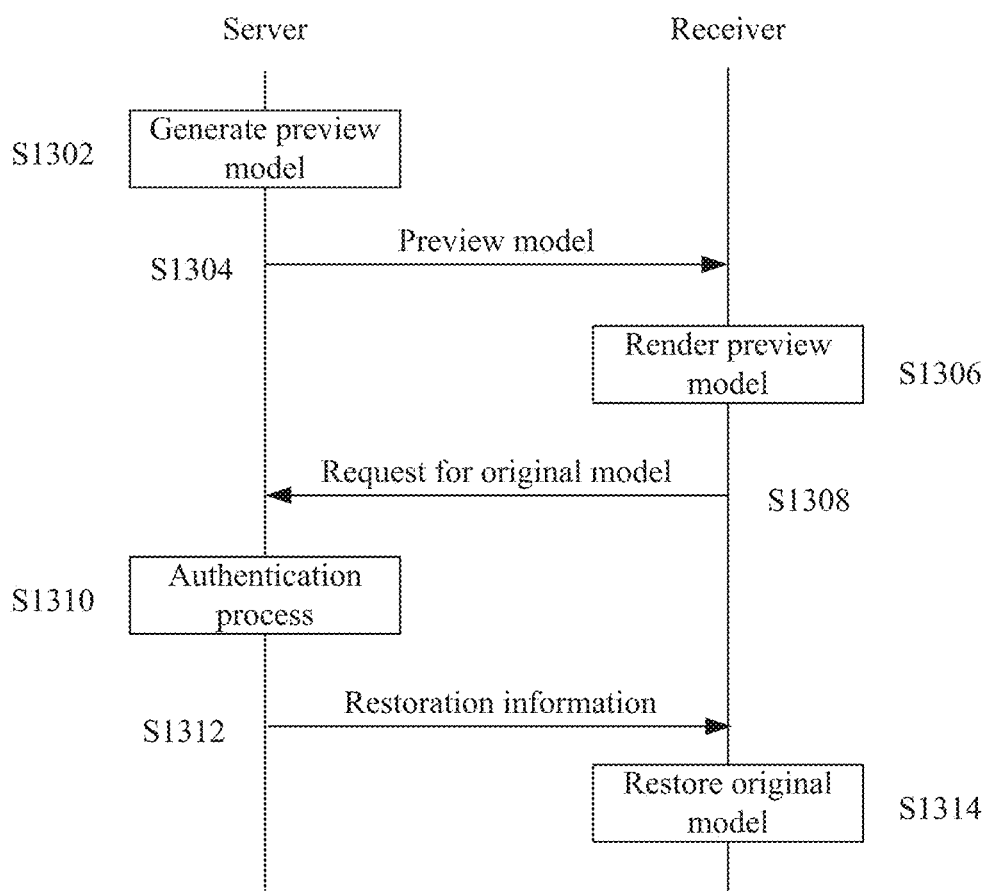
FIG. 13 is a schematic diagram illustrating an exemplary process of interaction between a server and a receiver for a three-dimensional model.

FIG. 13 illustrates an exemplary process of interaction between a server and a receiver for a three-dimensional model. The server may be, for example, a server that provides a three-dimensional model, and the receiver may be, for example, a three-dimensional printing cooperative manufacturer, a three-dimensional model design sharing party or transaction party, or a three-dimensional model related product experience purchaser.

As shown in FIG. 13, a preview version of the three-dimensional model, i.e., a preview model, is generated by the server at S1302, and the preview model is transmitted to the receiver at S1304. The generation and transmission of the preview model may be performed, for example, in response to a request (which is not shown) from the receiver.

At S1306, the preview model is rendered by the receiver. The rendering may be implemented by generating a graphical representation of the preview model by image reconstruction. In addition, in three-dimensional printing applications, the rendering may also be implemented by controlling the three-dimensional printing device by the receiver to print the preview model.

If the receiver determines to acquire the original model corresponding to the preview model, the receiver issues request information for the original model to the server at S1308. The request information may include, for example, identification information indicating an identity of the receiver. At S1310, the server performs an authentication process on the receiver issuing the request. Further, the processes of S1303 and S1310 may also involve the purchase of the original model.

In a case where the authentication process of S1310 is passed, the server transmits restoration information for restoring the simplified part of the preview model to the original version having a high level of details to the receiver at S1312. At S1314, the receiver restores the original model based on the restoration information.

In the above process, the unauthorized receiver can only view the preview version of the three-dimensional model, thus ensuring the data security of the original three-dimensional model. Moreover, for the receiver who passes the authentication thereafter (for example, the user who purchased the original three-dimensional model), only the restoration information with a relatively small amount of data needs to be transmitted, thereby reducing the communication load of the authorized distribution operation of the 3D model.

Further, according to an embodiment, the restoration information may be encrypted to further improve the data security of the original three-dimensional model.

Next, an embodiment in which the restoration information is encrypted is described below with reference to FIG. 2.

Figure 2:
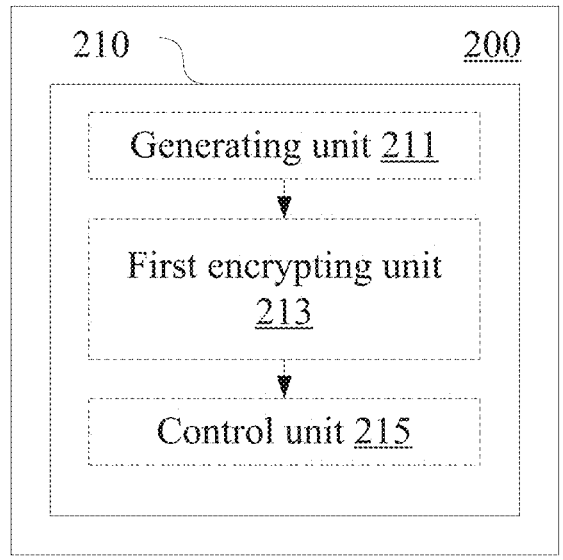
FIG. 2 is a block diagram showing a configuration example of an information processing apparatus according to another embodiment.

As shown in FIG. 2, an information processing apparatus 200 according to the present embodiment includes a processing circuit 210. The processing circuit 210 includes a generating unit 211, a first encrypting unit 213, and a control unit 215.

The generating unit 211 is configured to generate a modified version of the three-dimensional model, which is similar to that described above with reference to FIG. 1, and the detailed description thereof is omitted herein.

The first encrypting unit 213 is configured to encrypt restoration information for restoring the modified version of the three-dimensional model to an original version of the three-dimensional model.

The control unit 215 is configured to perform a control to transmit the modified version generated by the generating unit 211 and the restoration information encrypted by the first encrypting unit 213 to the receiver.

The control unit 215 may be configured to perform a control to transmit the modified version to the receiver along with the encrypted restoration information. Alternatively, the control unit 215 may be configured to perform a control to transmit the modified version and the encrypted restoration information separately to the receiver.

In the case where the modified version is transmitted to the receiver along with the encrypted restoration information, as described above, the encrypted restoration information may be embedded into the modified version of the model, for example by means of a watermark. Further, the receiver receiving the model into which the encryption restoration information is embedded may be a receiver that has not been authenticated. Since the restoration information is encrypted, the receiver cannot obtain the original three-dimensional model using the restoration information, but can obtain only the preview version of the model.

Thereafter, if the receiver requests to obtain the original three-dimensional model, the receiver may issue an authentication request to the server and perform the authentication process. Accordingly, the control unit 215 may further be configured to perform a control to transmit decryption information for the restoration information to an authorized receiver.

Figure 14:
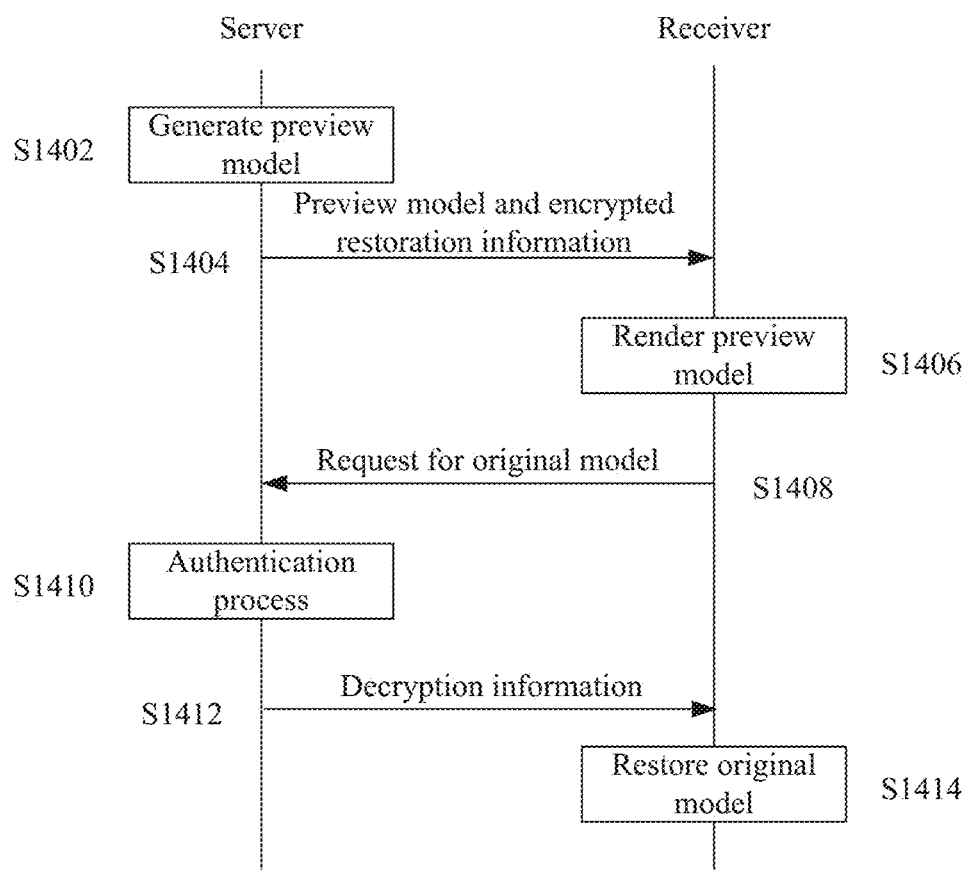
FIG. 14 is a schematic diagram illustrating another exemplary process of interaction between a server and a receiver for a three-dimensional model.

Accordingly, FIG. 14 illustrates an exemplary process of interaction between a server and a receiver for a three-dimensional model.

As shown in FIG. 14, a preview version of the three-dimensional model, i.e., a preview model, is generated by the server at S1402, and the preview model is transmitted to the receiver along with the encrypted restoration information at SI 404.

At S1406, the preview model is rendered by the receiver.

If the receiver determines to acquire the original model corresponding to the preview model, the receiver issues request information for the original model to the server at S1408.

At S1410, the server performs an authentication process on the receiver issuing the request.

In a case where the authentication process of S1410 is passed, the server transmits decryption information for the restoration information to the receiver at S1412.

At S1414, the receiver decrypts the restoration information based on the decryption information and restores the original model based on the restoration information.

In the above process, since the restoration information transmitted to the receiver along with the preview model is encrypted, the unauthorized receiver can only view the preview version of the three-dimensional model, thus ensuring the data security of the original three-dimensional model. Moreover, for the receiver who passes the authentication thereafter, only the decryption information with a relatively small amount of data needs to be transmitted, thereby reducing the communication load of the authorized distribution operation of the 3D model.

On the other hand, in a case where the control unit 215 is configured to perform a control to transmit the modified version and the encrypted restoration information separately to the receiver, the control unit 215 may be configured to firstly transmit the modified version to the receiver, and then transmit the encrypted restoration information and the decryption information for the restoration information to the receiver in the case where it is determined that the receiver is authorized.

Figure 15:
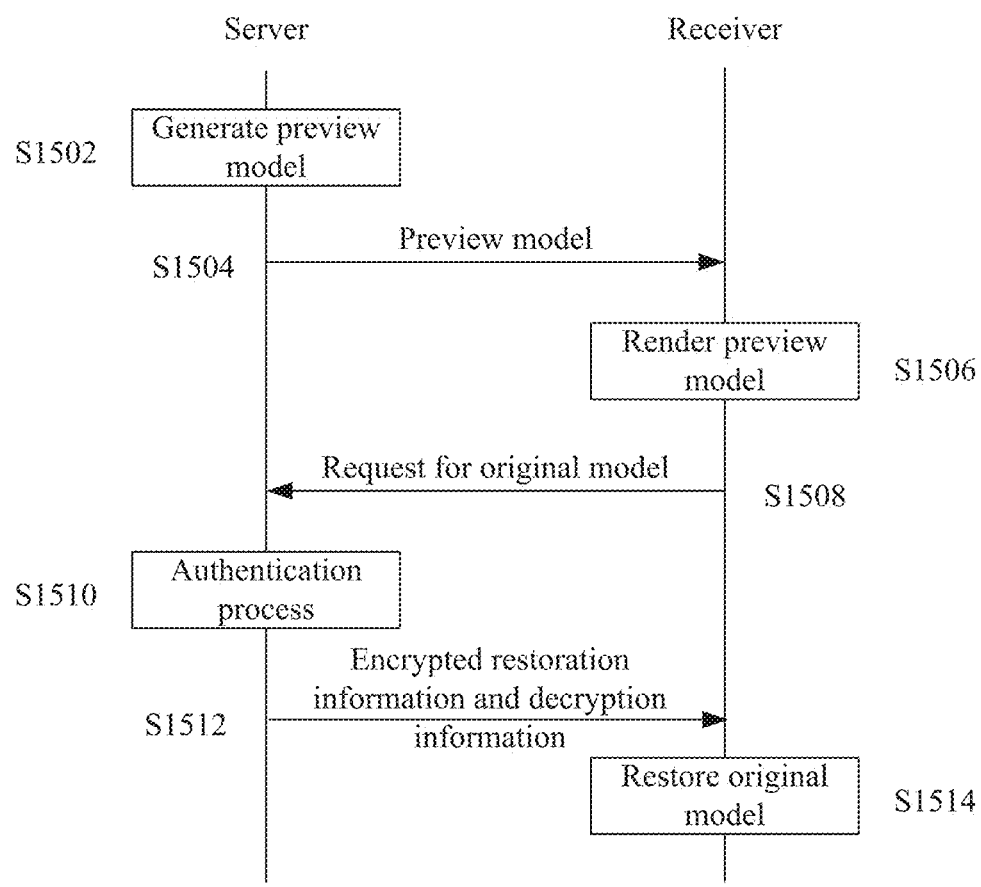
FIG. 15 is a schematic diagram illustrating another exemplary process of interaction between a server and a receiver for a three-dimensional model.

Accordingly, FIG. 15 illustrates an exemplary process of interaction between a server and a receiver for a three-dimensional model.

As shown in FIG. 15, a preview version of the three-dimensional model, i.e., a preview model, is generated by the server at S1502, and the preview model is transmitted to the receiver at S1504.

At S1506, the preview model is rendered by the receiver.

If the receiver determines to acquire the original model corresponding to the preview model, the receiver issues request information for the original model to the server at S1508.

At S1510, the server performs an authentication process on the receiver issuing the request.

In a case where the authentication process of S1510 is passed, the server transmits the encrypted restoration information and decryption information for the restoration information to the receiver at S1512.

At S1514, the receiver decrypts the restoration information based on the decryption information and restores the original model based on the restoration information.

In the above process, the unauthorized receiver can only view the preview version of the three-dimensional model, thus ensuring the data security of the original three-dimensional model. Moreover, for the receiver who passes the authentication thereafter, only the restoration information and the decryption information with a relatively small amount of data need to be transmitted, thereby reducing the communication load of the authorized distribution operation of the 3D model.

In addition to the above-described local detail removal, in some applications, a specific region may need to be further encrypted according to design features to be protected. In other words, even in the preview version, it is not desirable to have an unauthorized receiver obtain the design features of the specific region.

Next, an embodiment in which the specific region is further encrypted is described with reference to FIG. 3.

Figure 3:
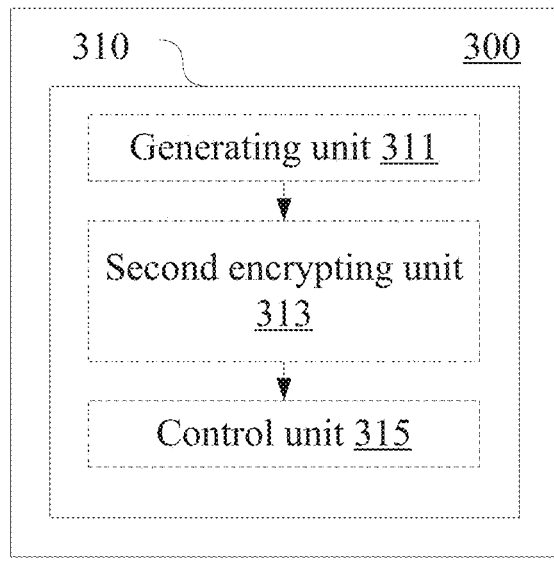
FIG. 3 is a block diagram showing a configuration example of an information processing apparatus according to yet another embodiment.

As shown in FIG. 3, an information processing apparatus 300 according to the present embodiment includes a processing circuit 310. The processing circuit 310 includes a generating unit 311, a second encrypting unit 313, and a control unit 315.

The generating unit 311 is configured to generate a modified version of the three-dimensional model, where a local detail of at least one part of the three-dimensional model is removed while keeping shape semantics of the at least one part of the original three-dimensional model unchanged. The specific manner of generating the modified version is similar to that described above with reference to FIG. 1, and the detailed description thereof is omitted herein.

The second encrypting unit 313 is configured to further encrypt a predetermined feature of the three-dimensional model on the basis of the modified version of the three-dimensional model generated by the generating unit 311. The predetermined feature is, for example, a specific region of the three-dimensional model selected according to design features to be protected.

Specifically, the encryption for the predetermined feature may include, for example, one or more of a point cloud encryption, a mesh encryption, and a vertex encryption.

The control unit 315 is configured to perform a control to transmit the three-dimensional model encrypted by the second encrypting unit 313 and restoration information corresponding to the local detail removal performed by the generating unit 311 to the receiver.

Next, an example of the encryption processing process performed by the second encrypting unit 313 is described with reference to FIG. 11 and FIG. 12.

Figure 11:
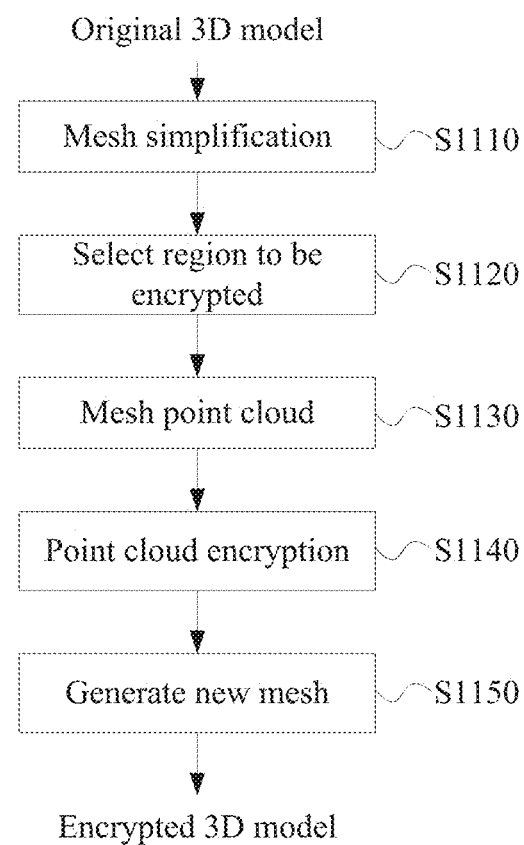
FIG. 11 is a flowchart showing a process of generating an encrypted three-dimensional model according to an exemplary embodiment.

As shown in FIG. 11, in S1110, mesh simplification is performed on the original three-dimensional model (which may include a part of the modified version of the original three-dimensional model generated by the generating unit 311 that has not undergone detail removal processing). For example, with respect to exemplary local features (including vertices a to h and edges between the vertices) illustrated in FIG. 12, an original mesh (a) is converted to, for example, a simplified mesh (b) by the mesh simplification process. Specifically, in this example, the vertices g and h are merged into a vertex (which is indicated by g&h), so that the mesh is simplified.

In S1120, a to-be-encrypted region is selected. For example, in the example of FIG. 12, a region from the vertex a to the vertex g&h is assumed as the to-be-encrypted region.

Figure 12:
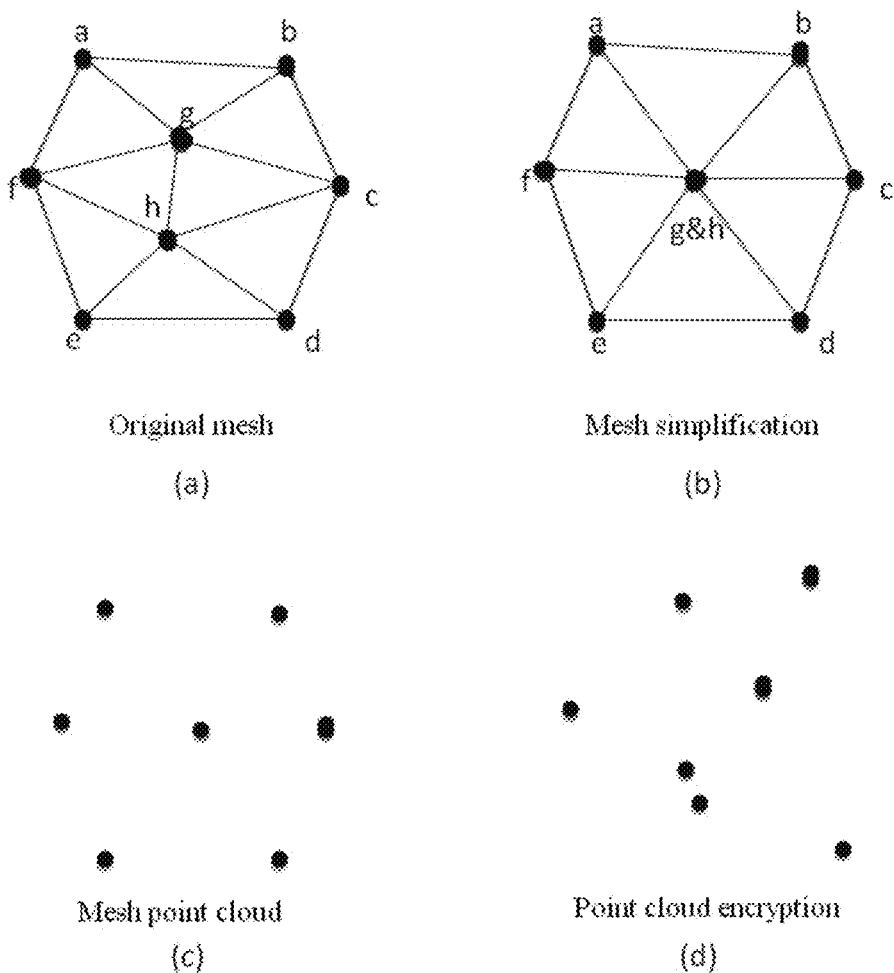
FIG. 12 is a schematic diagram illustrating encryption for a three-dimensional model according to an exemplary embodiment.

In S1130, a mesh of the to-be-encrypted region is converted to a point cloud, for example, as shown in (c) of FIG. 12. In addition, the point cloud may be generated by a method of randomly selecting points in the mesh region.

In S1140, point cloud encryption is performed, for example, as shown in (d) of FIG. 12. The point cloud encryption may be implemented by point-by-point encryption for point coordinates in the point cloud.

In S1150, a new mesh is generated based on the encrypted point cloud to obtain an encrypted three-dimensional model.

It should be understood that the present disclosure is not limited to the details illustrated in the above examples. For example, some of operations in the examples may be omitted, other operations may be included, or operations of various steps may be performed in a different order.

Further, the control unit 315 may further be configured to perform a control to transmit decryption information of the encrypted model obtained by the second encrypting unit 313 to an authorized receiver. For example, the decryption information of the encrypted model may be transmitted to the authorized receiver along with the restoration information (or the decryption information for the restoration information).

In the above description of the information processing apparatuses according to the embodiments of the present disclosure, it is apparent that some methods and processes are disclosed. Next, an information processing method according to an embodiment of the present disclosure is described without repeating the details which have been described above.

Figure 4:
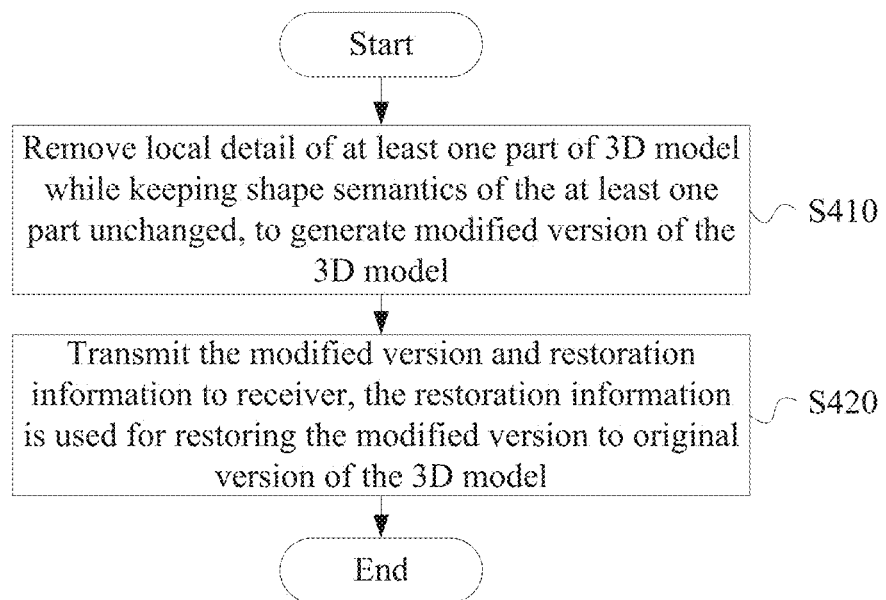
FIG. 4 is a flowchart showing a process example of an information processing method according to an embodiment of the present disclosure.

As shown in FIG. 4, an information processing method according to an embodiment of the present disclosure includes the following steps S410 and S420.

In S410, a local detail of at least one part of a three-dimensional model is removed while keeping shape semantics of the at least one part unchanged, to generate a modified version of the three-dimensional model.

In S420, the modified version and restoration information are transmitted to a receiver, where the restoration information is used for restoring the modified version to an original version of the three-dimensional model.

The information processing apparatus and the information processing method for a three-dimensional model server, i.e., a party providing a three-dimensional model, according to the embodiments of the present disclosure are described above. Further, an information processing apparatus and an information processing method for a three-dimensional model receiver are further provided in the present disclosure. As described above, the receiver may be, for example, a three-dimensional printing cooperative manufacturer, a three-dimensional model design sharing party or transaction party, or a three-dimensional model related product experience purchaser.

Figure 5:
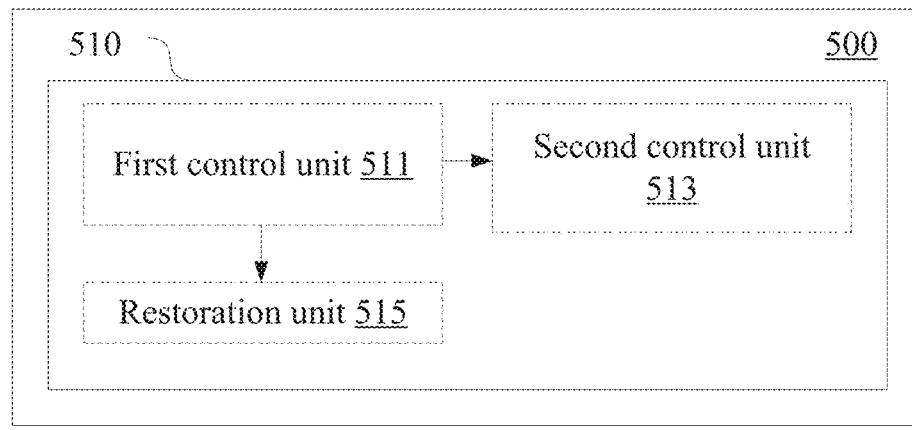
FIG. 5 is a block diagram showing a configuration example of an information processing apparatus according to an embodiment of the present disclosure.

As shown in FIG. 5, an information processing apparatus 500 according to an embodiment includes a processing circuit 510. The processing circuit 510 includes a first control unit 511, a second control unit 513, and a restoration unit 515. The information processing apparatus 500 may operate as, for example, a terminal device of a receiver, such as a computer (e.g., a desktop computer, a laptop computer), a workstation or a mobile terminal (such as a smart phone, a tablet). In addition, the processing circuit 510 may be implemented as, for example, a specific chip, a chipset, or a central processing unit (CPU).

It should be noted that, the first control unit 511, the second control unit 513, and the restoration unit 515 are shown in the form of functional blocks in FIG. 5, but functions of the first control unit 511, the second control unit 513, and the restoration unit 515 may be implemented by processing circuit 510 as a whole, and it is not necessarily implemented by separate actual components in the processing circuit 510. In addition, although the processing circuit 510 is illustrated as a block in FIG. 5, the information processing apparatus 500 may include multiple processing circuits, and the functions of the first control unit 511, the second control unit 513, and the restoration unit 515 may be distributed into multiple processing circuits such that the multiple processing circuits operate in cooperation with each other to perform the functions.

The first control unit 511 is configured to perform a control to receive a modified version of a three-dimensional model from a sender, where the modified version is generated by removing a local detail of at least one part of the three-dimensional model while keeping shape semantics of the at least one part unchanged. The sender may be, for example, a server at the three-dimensional model server, and is used to generate the modified version of the three-dimensional model, for example, in the manner described above in the embodiment described for the three-dimensional model server.

The second control unit 513 is configured to perform a control to render the modified version. The rendering may include, for example, generating a graphical representation of the preview model by image reconstruction. In addition, in three-dimensional printing applications, the rendering may include controlling the three-dimensional printing device to print the preview model.

The restoration unit 515 is configured to restore the modified version to an original version of the three-dimensional model based on restoration information received from the sender.

As mentioned above, the restoration information may be obtained by only an authorized user. Accordingly, an information processing apparatus according to an embodiment is configured to perform an authentication process.

Figure 6:
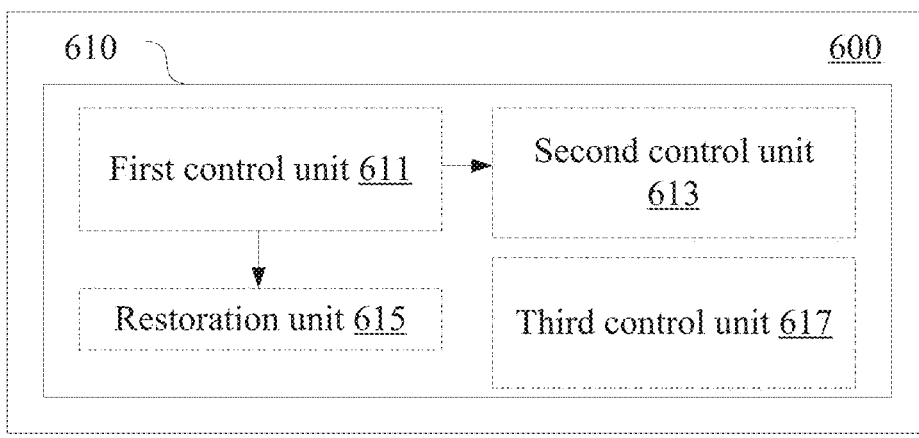
FIG. 6 is a block diagram showing a configuration example of an information processing apparatus according to another embodiment.

As shown in FIG. 6, an information processing apparatus 600 according to an embodiment includes a processing circuit 610. The processing circuit 610 includes a first control unit 611, a second control unit 613, a restoration unit 615, and a third control unit 617. The configurations of the first control unit 611, the second control unit 613, and the restoration unit 615 are similar to those described with reference to FIG. 5, and the detailed description thereof is omitted herein.

The third control unit 617 is configured to perform a control to perform an authentication request for the three-dimensional model. As mentioned above, the authentication request may also involve a process related to the purchase of the three-dimensional model.

The first control unit 611 is further configured to: in a case where the authentication request is approved, perform a control to receive decryption information for the restoration information from the sender. The restoration unit 615 may further be configured to decrypt the restoration information based on the decryption information.

In addition, in the data from the three-dimensional model server, in addition to the local detail removal, further encryption processing may be performed on a specific region.

According to an embodiment, the first control unit 611 is further configured to: in a case where the authentication request is approved, perform a control to receive decryption information for decrypting a predetermined feature of the three-dimensional model from the sender. For example, the decryption information of the encrypted model may be received along with the restoration information (or decryption information for the restoration information).

Next, an information processing method for a three-dimensional model receiver according to an embodiment of the present disclosure is described without repeating the details that have been described above.

Figure 7:
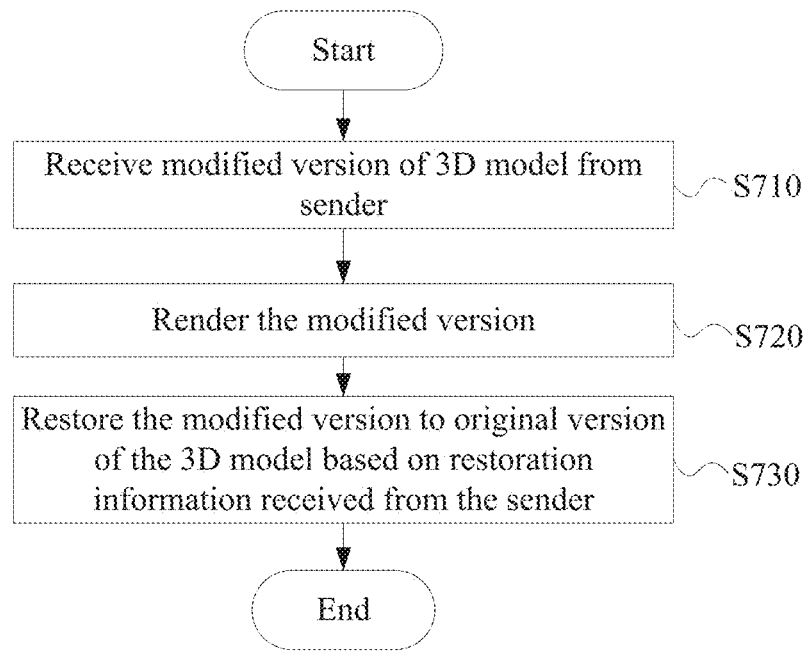
FIG. 7 is a flowchart showing a process example of an information processing method according to an embodiment of the present disclosure.

As shown in FIG. 7, an information processing method according to an embodiment includes the following steps S710 to S730.

In S710, a modified version of a three-dimensional model is received from a sender, where the modified version is generated by removing a local detail of at least one part of the three-dimensional model while keeping shape semantics of the at least one part unchanged.

In S720, the modified version is rendered.

In S730, the modified version is restored to an original version of the three-dimensional model based on restoration information received from the sender.

Figure 8:
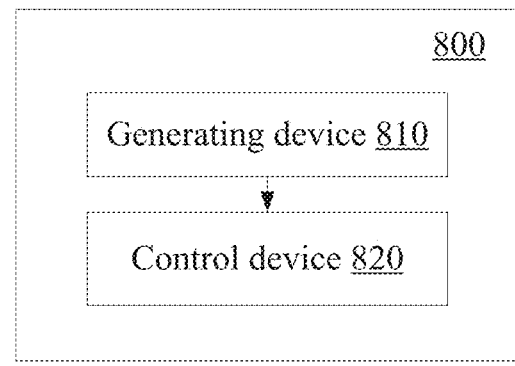
FIG. 8 is a block diagram showing a configuration example of an information processing apparatus according to an embodiment of the present disclosure.

In addition, FIG. 8 shows a configuration example of an information processing apparatus according to an embodiment. An information processing apparatus 800 according to the present embodiment includes: a generating device 810 and a control device 820. The generating device 810 is configured to remove a local detail of at least one part of a three-dimensional model while keeping shape semantics of the at least one part unchanged, to generate a modified version of the three-dimensional model. The control device 820 is configured to perform a control to transmit the modified version and restoration information to a receiver, where the restoration information is used for restoring the modified version to an original version of the three-dimensional model.

Figure 9:
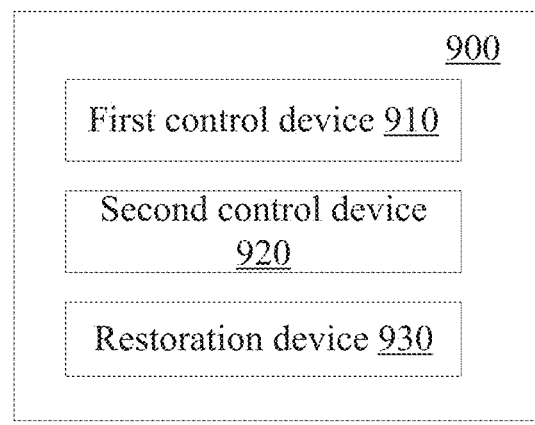
FIG. 9 is a block diagram showing a configuration example of an information processing apparatus according to another embodiment of the present disclosure.

In addition, FIG. 9 shows a configuration example of an information processing apparatus according to another embodiment. An information processing apparatus 900 according to the present embodiment includes: a first control device 910, a second control device 920, and a restoration device 930. The first control device 910 is configured to perform a control to receive a modified version of the three-dimensional model from a sender, where the modified version is generated by removing a local detail of at least one part of the three-dimensional model while keeping shape semantics of the at least one part unchanged. The second control device 920 is configured to perform a control to render the modified version. The restoration device 930 is configured to restore the modified version to an original version of the three-dimensional model based on restoration information received from the sender.

As an example, steps of the above-described method and composing modules and/or units of the above-described device may be implemented as software, firmware, hardware, or a combination thereof. In a case of implementing by software or firmware, a program constituting the software for implementing the above-described method may be installed from a storage medium or a network to a computer (for example, a general-purpose computer 1000 shown in FIG. 10) having a dedicated hardware structure. The computer can perform various functions when being installed with various programs.

Figure 10:
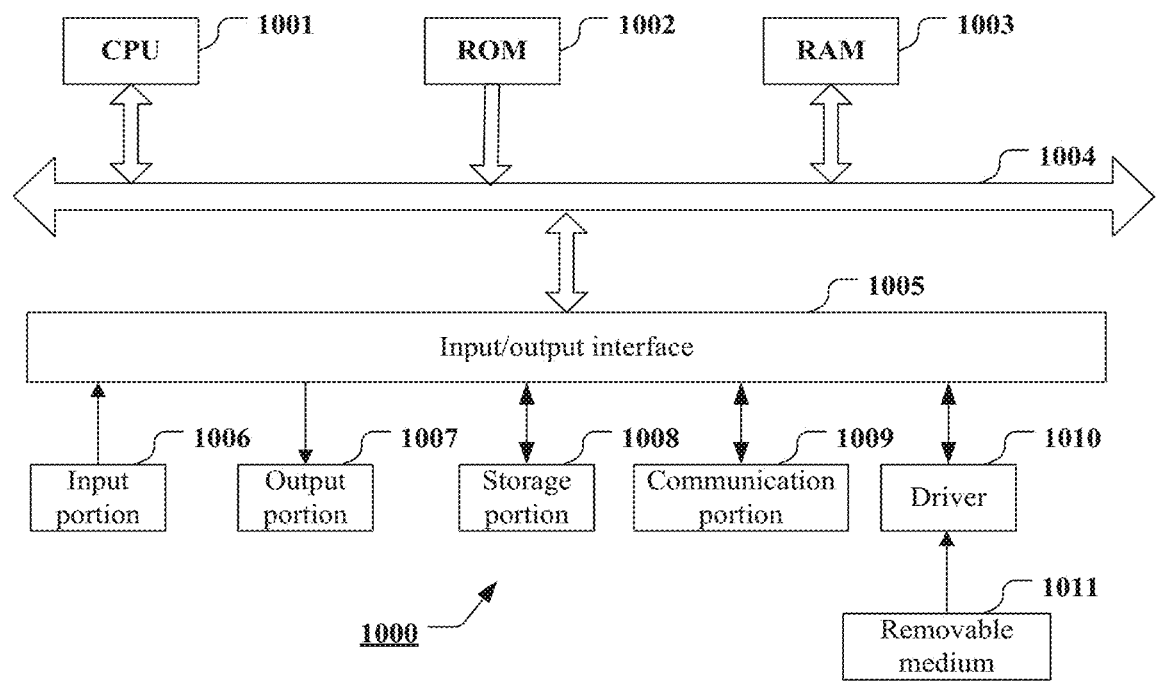
FIG. 10 is a block diagram showing an exemplary structure of a computer for implementing the method and the device according to the present disclosure.

In FIG. 10, an arithmetic processing unit (i.e., a CPU) 1001 performs various types of processing according to programs stored in a read only memory (ROM) 1002 or programs loaded from a storage portion 1008 to a random access memory (RAM) 1003. Data required when the CPU 1001 performs various types of processing is stored in the RAM 1003 as needed. The CPU 1001, the ROM 1002 and the RAM 1003 are linked to each other via a bus 1004. An input/output interface 1005 is also linked to the bus 1004.

The following components are linked to the input/output interface 1005: an input portion 1006 (including a keyboard, a mouse or the like), an output portion 1007 (including a display such as a cathode ray tube (CRT), a liquid crystal display (LCD), a speaker or the like), a storage portion 1008 (including a hard disk or the like), and a communication portion 1009 (including a network interface card such as a LAN card, a modem or the like). The communication portion 1009 performs communication processing via a network such as the Internet. A driver 1010 may also be linked to the input/output interface 1005 as needed. A removable medium 1011 such as a magnetic disk, an optical disk, a magneto-optical disk and a semiconductor memory may be installed on the driver 1010 as needed, such that the computer programs read from the removable medium 1011 are installed in the storage portion 1008 as needed.

In a case that the series of processing described above is implemented by software, programs constituting the software are installed from a network such as the Internet or a storage medium such as the removable medium 1011.

Those skilled in the art should understand that the storage medium is not limited to the removable medium 1011 shown in FIG. 10 in which programs are stored and which is distributed separately from the apparatus to provide the programs to the user. An example of the removable medium 1011 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 1002, a hard disk included in the storage portion 1008 or the like. The programs are stored in the storage medium, and the storage medium is distributed to the user together with the device including the storage medium.

According to an embodiment of the present disclosure, a program product storing machine-readable instruction codes is further provided. When read and executed by a machine, the instruction codes cause the machine to perform the above-described method according to the embodiment of the present disclosure.

Accordingly, a storage medium for carrying the above-described program product storing the machine-readable instruction codes is also included in the present disclosure. The storage medium includes, but not limited to, a floppy disk, an optical disk, a magneto-optical disk, a storage card, a memory stick or the like.

In the above description of specific embodiments of the present disclosure, the features described and/or illustrated with respect to one embodiment may be used in one or more other embodiments in the same or similar manner, may be combined with features in other embodiments, or may replace features in other embodiments.

It should be noted that the term "comprising/including" as used herein refers to the presence of a feature, element, step, or component, but does not exclude the presence or addition of one or more other features, elements, steps or components.

In the above embodiments and examples, reference numerals consist of numerals are used to represent steps and/or units. It should be understood by those skill in the art that the reference numerals are used only for facilitating description and illustration and are not intended to represent an order or limit in any other manner.

In addition, the method of the present disclosure is not limited to be performed in a chronological order described in the specification, but may also be performed in other chronological order, in parallel or independently. Therefore, the order for executing the method described in this specification does not limit the technical scope of the present disclosure.

Although the present disclosure has been described by specific embodiments according to the present disclosure, it should be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents shall be construed as being included within the scope of protection of the present disclosure.

The invention claimed is:

1. An information processing apparatus, comprising:
a processing circuit configured to:
generate or obtain an original three-dimensional model;
generate a first modified version of the three-dimensional model by removing a local detail of at least one part of the original three-dimensional model while keeping shape semantics of the at least one part unchanged;
generate restoration information for converting the first modified version of the three-dimensional model back to the original three-dimensional model;
encrypt the restoration information with a first encryption process to generate encrypted restoration information,
wherein the encrypted restoration information is embedded as a three-dimensional watermark in the first modified version of the three-dimensional model;
generate a second modified version of the three-dimensional model by encrypting a predetermined feature of the first modified version of the three-dimensional model with a second encryption process that is separate from the first encryption process;
transmit the encrypted restoration information and the second modified version of the three-dimensional model to an external device;
receive, from the external device, a first request for first decryption information to generate the first modified version of the three-dimensional model from the second modified version of the three-dimensional model;
determine whether or not to authorize the first request;
upon authorizing the first request, provide the first decryption information to the external device;
receive, from the external device, a second request for second decryption information to generate the original modified version of the three-dimensional model from the first modified version of the three-dimensional model;
determine whether or not to authorize the second request; and
upon authorizing the second request, provide the encrypted restoration information to the external device.

2. The information processing apparatus according to claim 1,
wherein the local detail is removed by one or more of: smoothing, vertex elimination, and three-dimensional mesh simplification, and
wherein the second encryption is one of point cloud encryption, mesh encryption or vertex encryption.

3. An information processing method performed by a device having a transceiver, processor and memory, the method comprising:
generating or obtaining an original three-dimensional model;
generating a first modified version of the three-dimensional model by removing a local detail of at least one part of the original three-dimensional model while keeping shape semantics of the at least one part unchanged;
generating restoration information for converting the first modified version of the three-dimensional model back to the original three-dimensional model;
encrypting the restoration information with a first encryption process to generate encrypted restoration information,
wherein the encrypted restoration information is embedded as a three-dimensional watermark in the first modified version of the three-dimensional model;
generating a second modified version of the three-dimensional model by encrypting a predetermined feature of the first modified version of the three-dimensional model with a second encryption process that is separate from the first encryption process;
transmitting the encrypted restoration information and the second modified version of the three-dimensional model to an external device;
receiving, from the external device, a first request for first decryption information to generate the first modified version of the three-dimensional model from the second modified version of the three-dimensional model, the first request including first authorization information;
determining whether or not to authorize the first request based on the first authorization information;
upon authorizing the first request, providing the first decryption information to the external device to enable the external device to decrypt the predetermined feature;
receiving, from the external device, a second request for second decryption information to generate the original modified version of the three-dimensional model from the first modified version of the three-dimensional model, the second request including second authorization information;
determining whether or not to authorize the second request based on the second authorization information; and
upon authorizing the second request, providing the encrypted restoration information to the external device to enable the external device to restore the at least one detail.

4. The method of claim 3,
wherein the local detail is removed by one or more of: smoothing, vertex elimination, and three-dimensional mesh simplification,
wherein the second encryption is one of point cloud encryption, mesh encryption or vertex encryption.

5. An information processing apparatus, comprising:
a processing circuit configured to:
receive encrypted restoration information and a second modified version of a three-dimensional model from an external device;
render the second modified version of the three-dimensional model;
transmit, to the external device, a first request for first decryption information to generate a first modified version of the three-dimensional model from the second modified version of the three-dimensional model, the first request including first authorization information;
upon the external device authorizing the first request based on the first authorization information, receive the first decryption information from the external device;
render the first modified version of the three-dimensional model by using the first decryption information to decrypt a predetermined feature of the first modified version of the three-dimensional model that was encrypted in the second modified version of the three-dimensional model by a second encryption process of the external device;
transmit, to the external device, a second request for second decryption information to generate an original modified version of the three-dimensional model from the first modified version of the three-dimensional model, the second request including second authorization information;

upon the external device authorizing the second request based on the second authorization information, receive the second decryption information from the external device;

decrypt the encrypted restoration information with the second decryption information, wherein the encrypted restoration information is embedded as a three-dimensional watermark in the first modified version of the three-dimensional model via a first encryption process of the external device that is separate from the second encryption process; and render the original version of the three-dimensional model by using the decrypted restoration information to restore a local detail of at least one part of the original three-dimensional model that was removed by the external device by a process that kept shape semantics of the at least one part unchanged.

6. The information processing apparatus according to claim 5, wherein the local detail is removed by one or more of: smoothing, vertex elimination, and three-dimensional mesh simplification, and wherein the second encryption is one of point cloud encryption, mesh encryption or vertex encryption.

7. An information processing method performed by a device having a transceiver, processor and memory, the method comprising:

receiving encrypted restoration information and a second modified version of a three-dimensional model from an external device;

rendering the second modified version of the three-dimensional model;

transmitting, to the external device, a first request for first decryption information to generate a first modified version of the three-dimensional model from the second modified version of the three-dimensional model, the first request including first authorization information;

upon the external device authorizing the first request based on the first authorization information, receiving the first decryption information from the external device;

rendering the first modified version of the three-dimensional model by using the first decryption information to decrypt a predetermined feature of the first modified version of the three-dimensional model that was encrypted in the second modified version of the three-dimensional model by a second encryption process of the external device;

transmitting, to the external device, a second request for second decryption information to generate an original modified version of the three-dimensional model from the first modified version of the three-dimensional model, the second request including second authorization information;

upon the external device authorizing the second request based on the second authorization information, receiving the second decryption information from the external device;

decrypting the encrypted restoration information with the second decryption information, wherein the encrypted restoration information is embedded as a three-dimensional watermark in the first modified version of the three-dimensional model via a first encryption process of the external device that is separate from the second encryption process; and rendering the original version of the three-dimensional model by using the decrypted restoration information to restore a local detail of at least one part of the original three-dimensional model that was removed by the external device by a process that kept shape semantics of the at least one part unchanged.

8. The method of claim 7, wherein the local detail is removed by one or more of: smoothing, vertex elimination, and three-dimensional mesh simplification, wherein the second encryption is one of point cloud encryption, mesh encryption or vertex encryption.

* * * * *